United States Patent [19]
Pink et al.

[11] Patent Number: 5,535,479
[45] Date of Patent: Jul. 16, 1996

[54] PORTABLE BLOWER/VACUUM HANDLE ARRANGEMENT

[75] Inventors: Anthony N. Pink, Shorewood; Steven J. Svoboda, Bloomington; Dean R. Toensing, Minnetonka, all of Minn.

[73] Assignee: The Toro Company, Bloomington, Minn.

[21] Appl. No.: 375,150

[22] Filed: Jan. 19, 1995

[51] Int. Cl.⁶ .................................................. A47L 9/32
[52] U.S. Cl. ............................. 15/410; 15/330; 16/110 R
[58] Field of Search ......................... 15/330, 405, 410; 16/110 R; 74/551.9; 403/348, 349; D08/65, 69

[56] References Cited

U.S. PATENT DOCUMENTS

| | | | |
|---|---|---|---|
| D. 310,437 | 9/1990 | Gierke et al. | D. 32/15 |
| 3,618,157 | 11/1971 | Bassin | 15/330 |
| 4,121,320 | 10/1978 | Feiner | 15/406 |
| 4,223,419 | 9/1980 | Sato et al. | 15/327 C |
| 4,269,571 | 5/1981 | Shikutani et al. | 15/405 |
| 4,290,165 | 9/1981 | Hiramatsu et al. | 15/330 |
| 4,325,163 | 4/1982 | Mattson | 15/330 |
| 4,413,371 | 11/1983 | Tuggle et al. | 15/405 |
| 4,644,606 | 2/1987 | Luerken et al. | 15/330 |
| 4,694,528 | 9/1987 | Comer et al. | 15/330 |
| 4,870,714 | 10/1989 | Miner | 15/327 |
| 4,972,733 | 11/1990 | Olmr et al. | 74/551.9 |
| 5,222,275 | 6/1993 | Baker et al. | 15/329 |
| 5,342,126 | 8/1994 | Heston et al. | 403/349 |
| 5,440,781 | 8/1995 | Kitazawa et al. | 15/405 |

*Primary Examiner*—David Scherbel
*Assistant Examiner*—Terrence R. Till
*Attorney, Agent, or Firm*—Donald S. Trevarthen

[57] ABSTRACT

A portable hand-held convertible blower and vacuum unit having a primary handle on the housing and a secondary handle located on the vacuum tube attachment. The secondary handle comprises a generally compliant gripping surface and enables the operator to connect or disconnect the vacuum tube from the housing in order to convert the unit from blower to vacuum mode or vice versa. The connection between the vacuum tube and the unit housing comprises a bayonet fitting. The handle also affords a second gripping surface for use of the unit during vacuum operation. Since the handle is attached to the vacuum tube, the handle does not hinder use of the unit during blower operation during which the vacuum tube is removed from the housing. When the vacuum tube is attached to the unit housing, the longitudinal axis of the gripping surface of the secondary handle is approximately perpendicular to the longitudinal axis of the primary handle that is connected to the housing.

12 Claims, 7 Drawing Sheets

PORTABLE BLOWER/VACUUM HANDLE ARRANGEMENT

TECHNICAL FIELD

The present invention pertains to a convertible blower and vacuum unit. More particularly, the present invention relates to a unique handle arrangement for a convertible electric blower and vacuum unit that includes a secondary handle mounted on a detachable vacuum tube. The secondary handle is used to connect and disconnect the vacuum tube to the housing of the unit and is used to assist the operator in handling the unit in the vacuum mode.

BACKGROUND OF THE INVENTION

In blower operation, typical blower/vac units provide a sweeping action created by the production of a fast moving stream of air from a rotating impeller within a housing. An exhaust or blower tube generally carries the air stream from the housing of the unit so that a nozzle at the outlet of the blower tube can be near the ground while the unit is being held with either one or both hands. The nozzle at the end of the blower tube is generally smaller than the outlet port on the housing of the unit, thereby causing a higher velocity air stream at the nozzle and allowing for greater precision and force in blowing particular materials.

In vacuum operation, the hand-held device draws air and debris though an intake or vacuum tube. Debris is reduced as it passes through an impeller and is deposited in a bag for disposal. The intake tube is generally of a wider diameter than a blower exhaust tube allowing for greater surface area coverage with each "sweep" of the unit. Debris actually passes through the unit, and, if it passes through the impeller which is driving the air stream, may be chipped or shredded into finer pieces.

Convertible blower and vacuum units are in common use by homeowners and professionals for the removal of debris from yards and driveways. A convertible blower and vacuum is a device which can be used as a blower or converted to operate as a vacuum. Conversion from the blower mode to the vacuum mode typically requires assembling a vacuum tube to the air inlet of the blower vacuum housing, to direct the suction, and placing a bag over the air outlet to collect the accumulated debris and/or dust. The bag used to collect the debris or dust is of a material which allows air but not small particles to pass through. Conversion from the vacuum mode to the blower mode typically requires removing the vacuum tube from the air inlet and placing an air inlet cover over the air inlet. The debris bag is removed from the air outlet and a blower tube is placed on the outlet.

Modern units are typically hand-held and, therefore, are made of light-weight materials and utilize lightweight power sources. The two most common power sources for the units are electric motors, usually supplied with electricity by a power cord, and gas motors of the two cycle, single cylinder variety.

Convertible blower vacuum units typically incorporate one or more handles for holding and maneuvering the units during operation in the blower or vacuum modes. A primary handle is usually located on the housing while a secondary handle, when utilized, is placed at a location separate from the primary handle.

One prior art convertible blower and vacuum unit is disclosed in U.S. Pat. No. 5,222,275 issued to Baker et al. on Jun. 29, 1993. Baker describes a convertible blower and vacuum unit 10 with a hinged inlet cover 24 that is moveable between a closed position where the cover 24 spans an air inlet opening 20 and an open position to allow insertion of a vacuum tube 50 into the inlet opening 20. The handle 26 is used to move the cover 24 between the open and closed positions. When the cover 24 is closed, air flows into the inlet opening 20 through a screen 38 in the cover 24, through arcuate slots 42 in a tubular extension 44 of the inlet opening 20 and over a circumferentially extending rib 46 formed on the cover 24. When the cover 24 is open and the vacuum tube 50 is attached, air and debris pass through the vacuum tube 50 and the air inlet opening 20. The handle 26 assists the operator when the unit 10 is in operation, especially in the vacuum mode. Handle 26 is not detachable and is therefore present in all modes. Handle 26 has a longitudinal axis that runs generally perpendicular to the longitudinal axis of a primary handle 28 that is located at the top of the unit 10.

Another prior art convertible blower and vacuum unit is disclosed in U.S. Pat. No. 4,644,606 issued to Luerken et al. on Feb. 24, 1987. Luerken describes a convertible blower and vacuum unit in which a handle 6 is connected to the top of the housing 2. A rear handle 22 is connected to the bottom of the housing 2. During blower operation, the handle 6 is used to direct and support the device 1. During vacuum operation, handle 6 and rear handle 22 are both used. The gripping surfaces of handle 6 and rear handle 22 are generally parallel. Rear handle 22 is not detachable and is present during vacuum operation.

Another prior art convertible blower and vacuum unit is disclosed in U.S. Pat. No. 4,870,714 issued to Miner on Oct. 3, 1989. Miner describes a convertible blower and vacuum unit which includes a first handle 28 attached to the motor housing 18 and has a second handle 36 which is attached to the first handle 28. Second handle 36 has a gripping surface which is generally perpendicular to the gripping surface of the first handle 28. First handle 28 is generally used alone when the unit is used in the blower mode while both handles 28 and 36 are used when the unit is used in the vacuum mode. Second handle 36 is not detachable and is therefore present in all modes.

Another prior art convertible blower and vacuum unit is disclosed in U.S. Pat. No. 4,290,165 issued to Hiramatsu et al. on Sep. 22, 1981. The hand-carried embodiment of the invention is shown in FIG. 1. The blower unit pictured, but not numbered, in FIG. 1 includes a primary handle on the housing. Collecting tube 4 is of an appropriate diameter to allow an operator to grasp the collecting tube 4. No secondary handle is disclosed.

Another prior art convertible blower and vacuum unit is disclosed in U.S. Pat. No. 4,694,528 issued to Comer et al. on Sep. 22, 1987. Handle 94 and reduced thickness area 106 are located on opposite sides of housing 12, allowing for two-handed operation of the unit in vacuum mode. Handle 94 alone is used in the blower mode.

A prior art blower unit is disclosed in U.S. Pat. No. 4,413,371 issued to Tuggle et al. on Nov. 8, 1983. Tuggle describes a blower attachment 10 for a hand-held power source 12. A handle 14 is located on the blower attachment 10. The handle 14 is used by the operator to support the blower during its operation. There is no reference as to whether the blower unit is convertible to a vacuum unit and the handle 14 does not appear to aid in the connection or removal of the blower nozzle.

Another prior art blower unit is disclosed in U.S. Pat. No. 4,223,419 issued to Sato et al. on Sep. 23, 1980. Sato describes a shoulder-supported pneumatic sweeping apparatus which includes an operating handle 27 on the air ejecting pipe 11. The operating handle 27 is not perpendicular to the grip 23 which is attached to the cover 112 of the unit.

Another prior art blower unit is disclosed in U.S. Pat. No. 4,121,320 issued to Feiner on Oct. 24, 1978. Feiner describes a gutter cleaner which uses a stream of air to dislodge material from gutters such as those found on the edges of the roofs of homes. In FIG. 1, an air motor 13 includes a handle and the hollow tube section 10 includes a second handle 14. Those handles are used to support and move the unit during operation.

In the present invention, a portable hand-held convertible blower and vacuum unit includes a primary handle on a housing and a detachable vacuum tube. A secondary handle on the detachable vacuum tube aids the operator in attaching and removing the vacuum tube to or from the blower vacuum housing. This feature aids in the conversion of the unit from vacuum to blower and vice versa, and aids in the operation of the unit in the vacuum mode. The secondary handle is located on the vacuum tube at an optimum distance and angle from the primary handle so as to provide a comfortable means (secondary with the primary handle) of holding the blower vacuum unit in the vacuum mode. Also, because the secondary handle in the present invention is attached to the vacuum tube itself, the handle does not hinder the effectiveness of the convertible blower and vacuum unit during blower operation since, during blower operation, the vacuum tube and its secondary handle are removed from the unit.

Known types of convertible blower and vacuum units lack the convenience and efficiency which are provided by the present invention.

SUMMARY OF THE INVENTION

Accordingly, the present invention includes an improved blower and vacuum unit.

Specifically, the present invention includes a convertible blower and vacuum unit including a housing with means forming an air inlet opening and means forming an air outlet opening and a fan scroll, a primary handle connected to the housing, a motor disposed within the housing, an impeller operatively connected to the motor and disposed within the fan scroll, a vacuum tube with a means for rotatably connecting the vacuum tube to the air inlet, and a secondary handle attached to the vacuum tube and providing means for axially and rotatably connecting and disconnecting the vacuum tube to the housing and for moving and supporting the vacuum tube assembly during operation of the convertible blower and vacuum unit.

Another embodiment of this invention could include a generally U-shaped secondary handle.

Another embodiment of this invention could include a secondary handle comprising a generally compliant gripping surface.

Another embodiment of this invention could include a means for rotatably and axially connecting the vacuum tube to the air inlet comprising a bayonet fitting, wherein the bayonet fitting comprises two tabs of differing shapes configured so as to pass through two slots of differing shapes, wherein each of the tabs may pass through exactly one of the slots.

Another embodiment of the invention could include a secondary handle which is located generally proximate to the housing when the vacuum tube is joined to the housing.

DETAILED DESCRIPTION OF A PREFERRED EMBODIMENT

Figure 1:
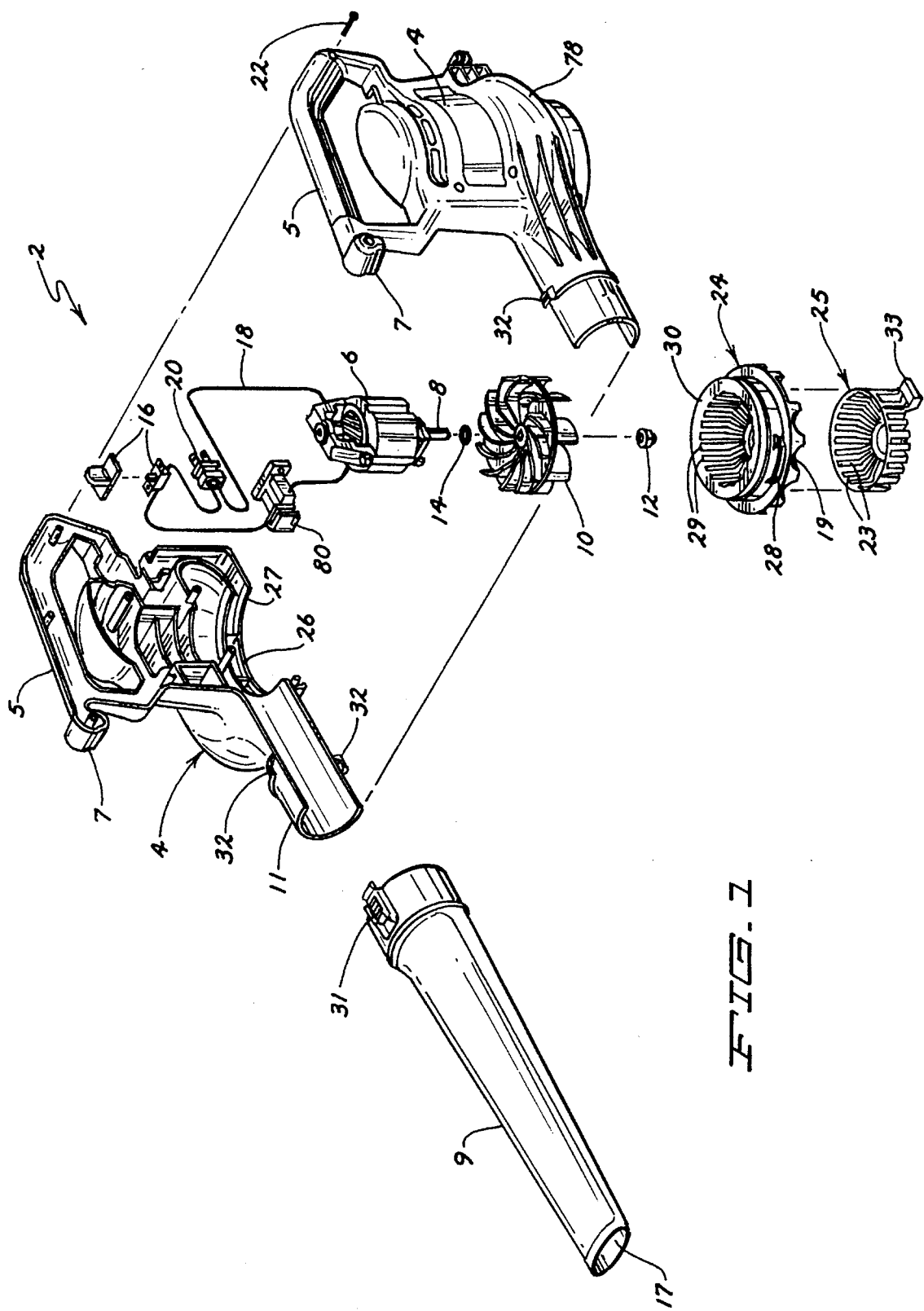
FIG. 1 is an exploded view of the convertible blower and vacuum unit in the blower mode.

In the description which follows, like parts are indicated throughout the specification with the same reference numerals, respectively.

FIG. 1 is an exploded view of an electric hand-held blower vacuum 2 (blower/vac). The blower/vac 2 includes a split housing 4 that is constructed of a plastic material such as ABS. A primary handle 5 is located at the top of the housing 4 halves. A primary handle extension 7 extends from the front of primary handle 5 such that the longitudinal axis of the extension 7 runs perpendicular to the longitudinal axis of primary handle 5. An electric motor 6 is adapted for mounting within the housing 4 halves. The motor 6 incorporates a drive shaft 8 upon which a centrifugal fan impeller 10 is fastened by a washer 14 and a nut 12. The impeller 10 is housed within a fan scroll 78 when the motor and impeller assembly is mounted within the housing 4. Motor 6 is selectively supplied with electrical current through an on-off switch assembly 16 and wiring 18. A male electrical plug 20 is adapted for mounting between the housing halves 4 such that electrical plug 20 extends out beyond the outer surface of the housing 4 when the two housing 4 halves are joined together with screws 22 (one shown). Male plug 20 can receive electrical current through a standard household extension cord (not shown). A blower outlet tube 9 is adapted to snap fit onto housing outlet 11 when the blower/vac is operated in the blower mode.

An air inlet cover 24 is adapted to fit over air inlet opening 26 of housing 4. An adjustable air inlet choke 25 fits over air inlet cover 24. Air inlet choke 25 can be rotated about the apertures 29 in cover 24 such that the air inlet area into the air inlet opening 26 can be varied which, in turn, will result in a variation of the total airflow through the blower/vac 2 and blower tube 9. Air inlet cover 24 incorporates male engagement members 28 which engage corresponding slots 47 (shown in FIG. 10) along the rim 27 of opening 26. The engagement members 28 and corresponding slots 47 coact to engage and retain the cover 24 over the opening 26 when the cover 24 is pushed into the opening 26 and rotated slightly clockwise. Air inlet cover 24 includes a centrifugal fan pressure ring 30 that is positioned immediately adjacent to the impeller 10 when the air inlet cover 24 is inserted into and retained within the air inlet opening 26. The fan pressure ring 30, when positioned immediately adjacent to the impeller 10, acts to increase the efficiency of the fan 10 by reducing the amount of axial air "spillover" or "leakage" from the high pressure side of any given fan blade. Air pressure ring 30 is, in the preferred embodiment, formed integral with the air inlet cover 24.

Figure 2:
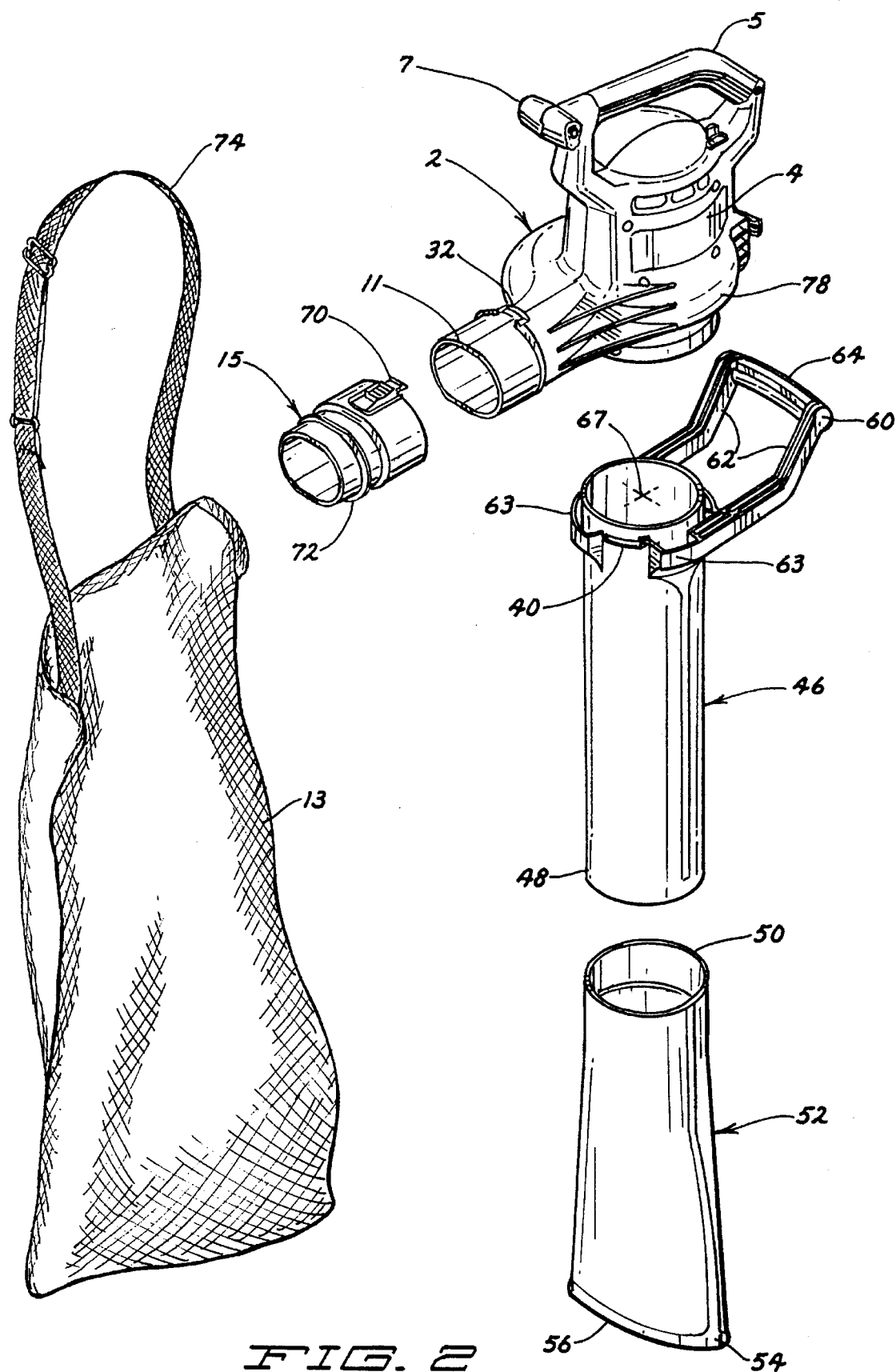
FIG. 2 is an exploded view of the convertible blower and vacuum unit in the vacuum mode.

FIG. 2 shows the halves of housing 4 assembled and shows the blower/vac 2 in the vacuum mode. Vacuum exhaust air and accompanying debris are exhausted through housing outlet 11 and into vacuum bag 13 which is removably secured to the outlet 11 via bag connector 15. A vacuum tube 46 is adapted to fit over air inlet 26 of housing 4. Vacuum tube 46 incorporates male engagement members 40 which engage corresponding slots 47 (shown in FIG. 7) along the rim of opening 26. The engagement members 40 and corresponding slots 47 coact to engage and retain the vacuum tube 46 over the opening 26 when the vacuum tube 46 is pushed into the opening 26 and rotated slightly clockwise. End 48 of the vacuum tube 46 is slightly smaller in outside diameter than the inside diameter of end 50 of vacuum tube extension 52, allowing for insertion of end 48 into end 50 in a frictional fit. Vacuum tube 46 and vacuum tube extension 52 are thus frictionally engaged and connected for use in the vacuum mode.

Figure 4:
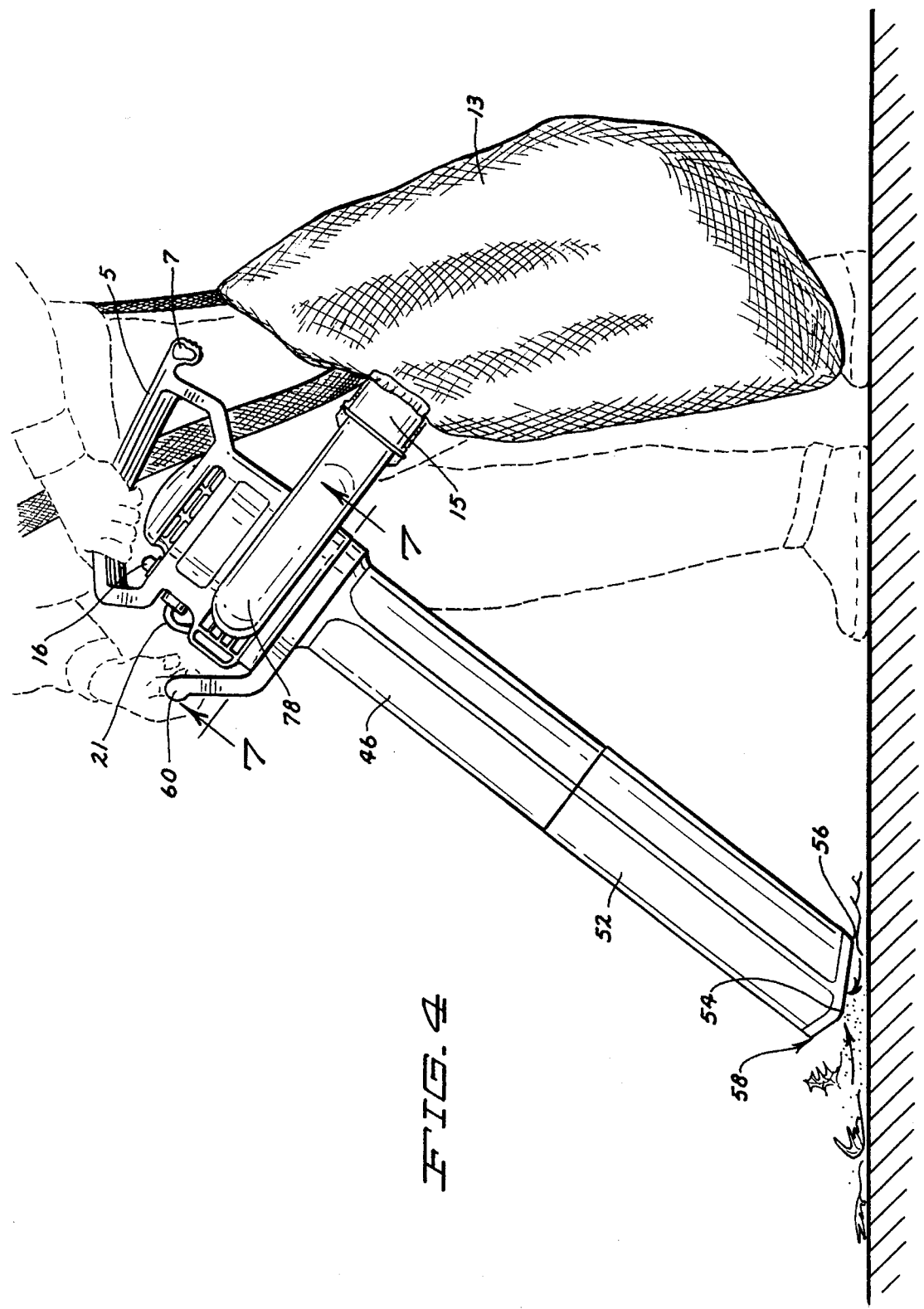
FIG. 4 is a perspective view showing an operator holding the convertible blower and vacuum unit in the vacuum mode.

Vacuum tube extension 52 has a generally elliptical end 54 with a trailing edge 56 which is vertically displaced from the leading edge 58 (see FIG. 4). The generally elliptical tube end 54 prevents bridging, across the opening, of leaves and other debris when operating in the vacuum mode. The resulting angled opening of tube end 54 as shown in FIG. 4 permits most of the end 54 to be passed substantially horizontally over the ground when the unit is operated at the angle shown.

Figure 5:
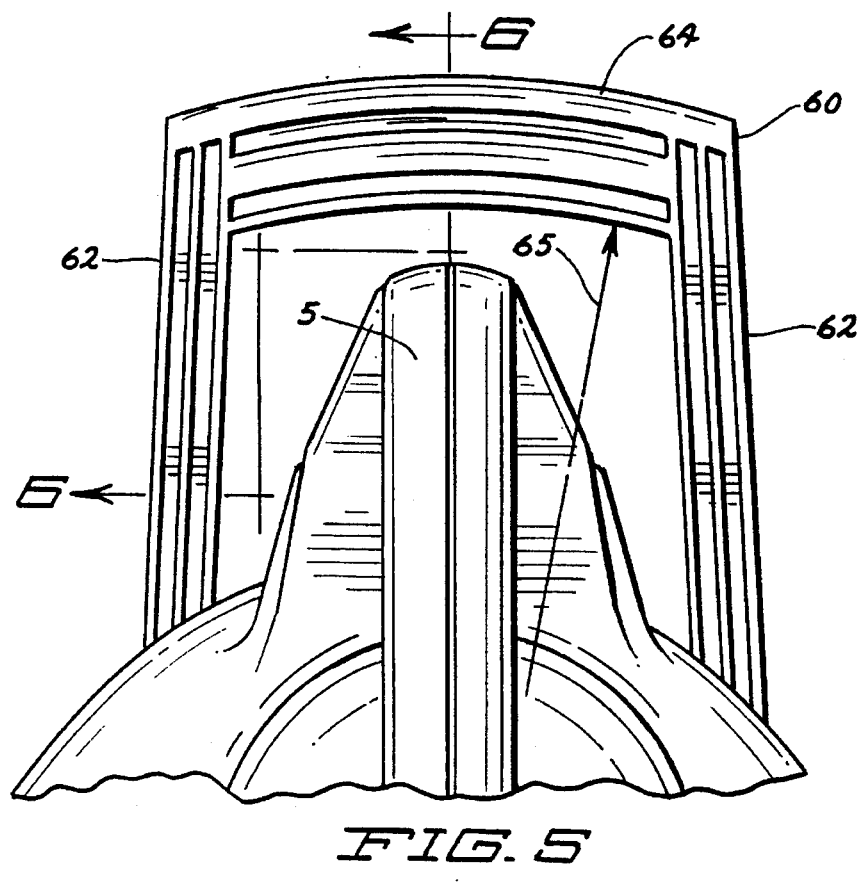
FIG. 5 is a top partial view of the convertible blower vacuum unit with the vacuum tube attachment in place.

Vacuum tube 46 incorporates a secondary handle 60 located towards the end of the vacuum tube 46 with the male engagement members 40. Secondary handle 60 includes legs 62 (as shown in FIG. 5) that extend, parallel to each other, away from the vacuum tube 46. A first section of each leg 62 extends first in a direction perpendicular to the longitudinal axis of the vacuum tube 46 and then, in a second section, extends further from the vacuum tube 46 at an angle of approximately 32 degrees off of parallel to the longitudinal axis. The angle of the second section of the legs 62 ensures that the gripping surface 64 is located at a point where it is convenient to grasp it in relation to the primary handle 5. A gripping surface 64 extends between the outer ends of legs 62.

The legs of the secondary handle 60 include leg bases 63 that wrap around a portion of the vacuum tube 46 as best shown in FIG. 2. The bases 63 serve as supports for the legs 62 of the secondary handle 60. The bases 63 also serve to add structural rigidity to the vacuum tube 46.

Figure 6:
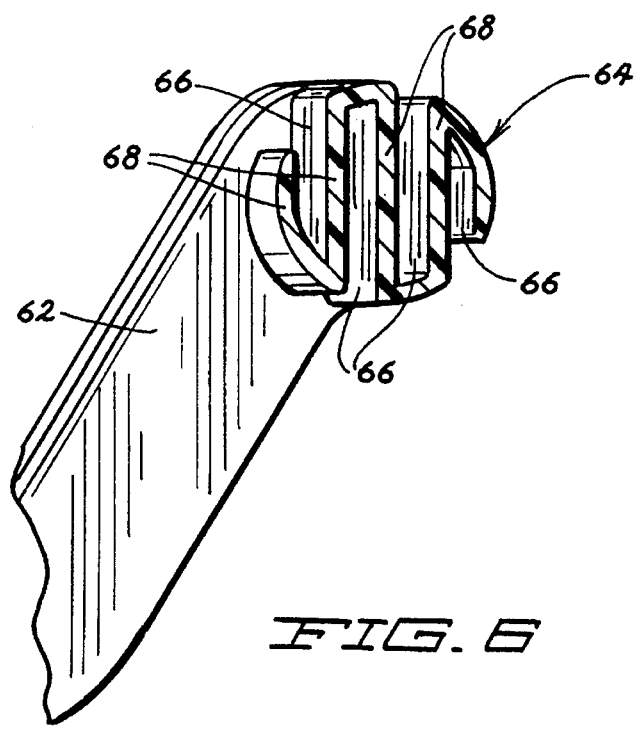
FIG. 6 is a sectional view of the secondary handle gripping surface.

Gripping surface 64 is shown in greater detail in FIGS. 5 and 6. FIG. 5 shows the gripping surface 64 to be a generally curved, cylindrical surface extending between the two legs 62. FIG. 6 shows a cross-section of the gripping surface 64 wherein the gripping surface 64 is not solid but rather includes a series of open channels 66 interspersed with legs 68 of solid plastic material. The effect of this laminar structure of solid legs 68 and open channels 66 is to provide the operator with an overall structure of the secondary handle gripping surface 64 that is somewhat compliant. That is, the gripping surface 64 will feel substantially firm yet somewhat compliant to the operator.

Gripping surface 64 also is formed with a generous radius 65 that aids in providing the operator with a comfortable gripping surface. In the preferred embodiment, the radius 65 of the gripping surface 64 is 6.94 inches from a point 67 on the longitudinal axis of the vacuum tube 46 to the surface of the gripping surface 64 facing the vacuum tube 46. The origin of the radius 65 need not be located at point 67.

When the vacuum tube 46 is fully connected to the housing 4, the gripping surface 64 is positioned such that its longitudinal axis is generally perpendicular to the longitudinal axis of the primary handle 5 as shown best in FIG. 5. This handle arrangement provides the operator with a convenient set of handles which can be used to operate the blower/vac unit with ease in the vacuum mode. This particular arrangement and the relationship to the operator is shown in FIG. 4 where the operator grasps the secondary handle 60 and its gripping surface 64 with one hand while grasping the primary handle 5 with the other hand. As FIG. 4 shows, the handle arrangement permits the operator to comfortably hold the blower/vac unit in the vacuum mode such that the angled end 54 of vacuum tube extension 52 passes in a generally parallel manner over the ground surface being vacuumed. Also, FIG. 4 shows that the gripping surface 64 of the secondary handle 60 lies generally in an imaginary plane that bisects the fan scroll 78 and the housing outlet 11 and which is oriented parallel to the air inlet opening 26.

Figure 3:
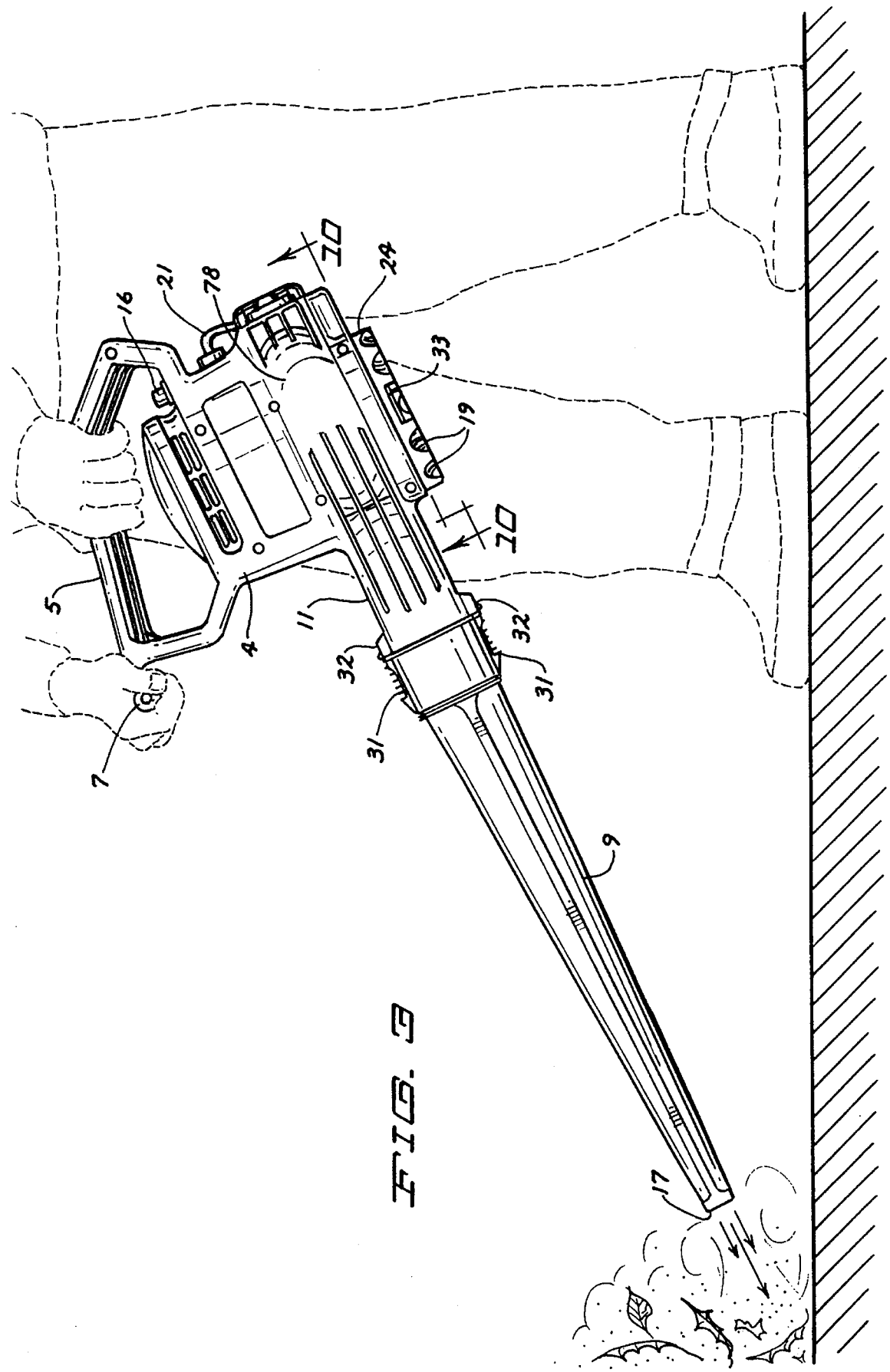
FIG. 3 is a perspective view showing an operator holding the convertible blower and vacuum unit in the blower mode.
Figure 11:
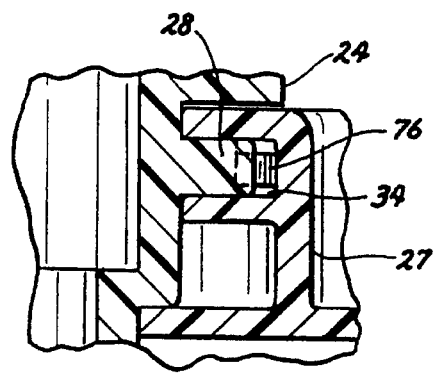
FIG. 11 is a sectional view taken along line 11—11 of FIG. 10 the air intake.
Figure 10:
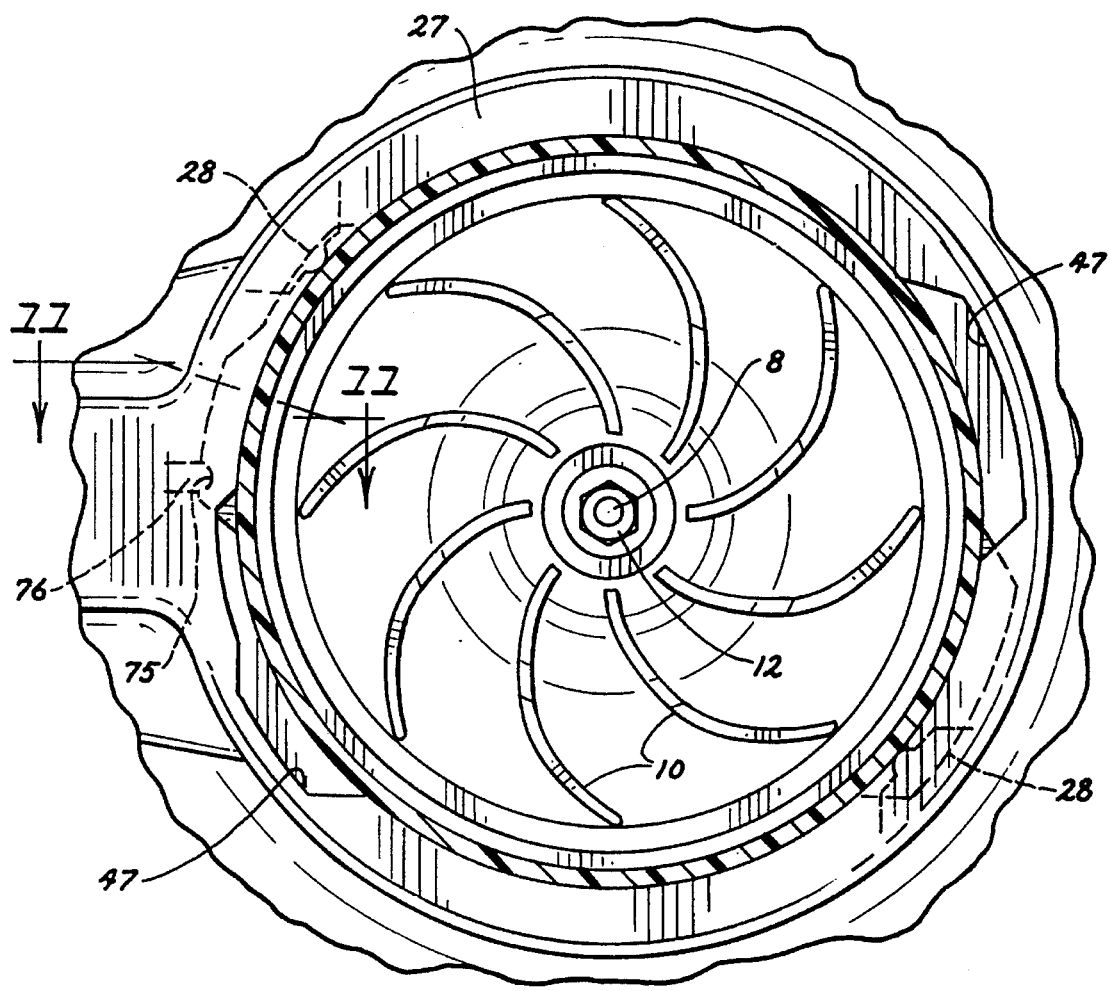
FIG. 10 is a sectional view taken along line 10—10 of FIG. 3 of the air intake opening area.

Operation Of the convertible electric blower/vac unit is as follows. To operate the blower/vac unit in the blower mode, the operator places the blower tube 9 over the blower/vac housing outlet 11. Clips 31 on the blower tube engage receptacles 32 on the blower/vac housing outlet 11, thus retaining the blower tube 9 onto the housing outlet 11. The resulting alignment of the blower tube 9 when it is mounted onto the housing outlet 11 is best shown in FIG. 3. Next, the operator must place the air inlet cover 24 onto the housing 4. The air inlet cover 24 is placed over the housing air inlet opening 26. Male engagement members 28 on the air inlet cover 24 must be aligned with the slots 47 formed in the air inlet opening rim 27 as shown in FIG. 10. The engagement members 28 must be pushed into the slots 47. Then, the air inlet cover 24 is rotated clockwise so that the engagement members 28 rotate clockwise in channel 34 away from the slots 47, thus retaining the air inlet cover 24 onto the housing 4 and over the air inlet opening 26. FIGS. 10 and 11 best show the details of how the male engagement members 28 rotate about the air inlet opening 26 and how the air inlet cover 24 is ultimately retained over the air inlet opening 26. FIG. 11 is a cross-sectional view of the air inlet opening rim 27 taken along line 11—11 shown in FIG. 10. In FIG. 11, male engagement members 28 are shown to be axially retained in channel 34. A depression 75 on one of the male engagement members 28 of the air inlet cover 24 engages a plunger 76 that opens and closes a safety interlock switch 80. The safety switch, when its contacts are open, prevents the unit from being operated. The plunger 76 must be depressed to close the interlock switch contacts to thus enable the motor to be electrically energized. Air inlet cover 24 is thus rotationally retained when it is rotated clockwise.

This method of engaging the air inlet cover 24 over the air inlet opening 26 is best known as a bayonet type connection.

The male engagement members 28 are sized differently from one another as are the slots 47 through which the engagement members 28 pass. The differing sizes of the engagement members 28 and the slots 47 are best shown in FIG. 10. The male engagement members 28 are also sized to be just slightly smaller than the corresponding slots 47 shown in FIG. 10. Due to the difference in size between the two engagement members 28 and the difference in size between the corresponding slots 47, the air inlet cover 24 can only be oriented one way when it is engaged over the air inlet opening 26.

The operator must then insert an electrical extension cord 21 (as shown in FIG. 3) onto the male plug 20 that extends out from the housing 4. Once an electrical current supply is available to the blower/vac, the operator can turn the unit on or off by flipping the switch 16 back and forth between the on and off positions. When the switch 16 is in the on position, the motor 6 rotates the impeller 10 at a speed of approximately 16000 r.p.m. Air is drawn in through the apertures 29 in the air inlet cover 24. The rotatably adjustable air choke 25 can be rotated back and forth so as to vary the inlet area defined by the apertures 29. Varying the inlet area regulates the amount of air that can be drawn through the system. The air pressure ring 30 sits adjacent to the impeller 10 when the air inlet cover 24 is fastened to the housing 4. The air pressure ring 30 reduces lateral spillover of air off of the impeller 10, thus making the impeller 10 more efficient at converting motor shaft horsepower into air horsepower. After the air is drawn into and through the housing 4 by the impeller 10, it is pushed out of the housing 4 through the housing outlet 11 by the impeller 10. The air then passes through the blower tube 9 and through the blower tube end 17 which acts as a concentrator nozzle. The tube end 17 has a reduced cross-sectional area as compared to the cross-sectional area of the upstream end of the blower tube 9. This reduced cross-sectional area results in the outlet velocity of the air stream being increased greatly. The increased air velocity enhances the debris moving ability of the blower/vac in the blower mode.

FIG. 3 shows the relationship of the operator to the blower/vac when it is operated in the blower mode. FIG. 3 shows the operator's one hand grasping the primary handle extension 7 while the operator's other hand grasps the primary handle 5. This particular handle arrangement permits the operator to comfortably hold the blower/vac while directing the blower tube end 17 towards the surface to be cleared of debris. The operator can also operate the blower/vac in the blower mode by simply holding the unit with one hand on the primary handle 5.

In order to convert the convertible blower/vac from blower mode to vacuum mode, the operator may begin by grasping the primary handle 5, as shown in FIG. 3, with one hand and applying pressure to the clips 31 on blower tube 9 with the forefinger and thumb of the other hand. While applying pressure to the clips 31, the operator applies a force generally directed away from the housing 4 until the blower tube 9 is completely free of the housing outlet 11. The blower tube 9 may then be set aside.

Next, the air inlet cover 24 must be removed from the air inlet opening 26. Removal of the air inlet cover 24 may be accomplished by the operator grasping the primary handle 5 with one hand and grasping the air inlet cover 24 with the other hand. Grasping of the air inlet cover 24 is accomplished by placing the fingertips of one hand into the indentations 19 in the outer ring of the air inlet cover 24. When an adequately tight grip is achieved on the air inlet cover 24 with one hand, the operator may turn the air inlet cover 24 slightly counter-clockwise while retaining a grip on the primary handle 5 with the other hand and not allowing the primary handle 5 to rotate. When the air inlet cover 24 has been turned as far as possible, the cover 24 may be removed from the air inlet opening 26 by applying a small amount of force on the cover 24 in a direction opposite that of the primary handle 5 until the cover 24 is completely free of the air inlet opening 26. The cover 24 may then be set aside.

Next, as shown in FIGS. 2 and 4, the vacuum tube 46 may be assembled with the vacuum tube extension 52. The operator may grasp the tube 46 with one hand and hold the tube 46 stationary. With the other hand, the operator may grasp the extension 52 and align the tube 46 with the extension 52. The operator then moves the extension 52 toward the tube 46 in a longitudinal manner until full frictional engagement of the vacuum tube 46 and the vacuum tube extension 52 has occurred. Assembly of the tube 46 and the extension 52 is thus completed.

Figure 8:
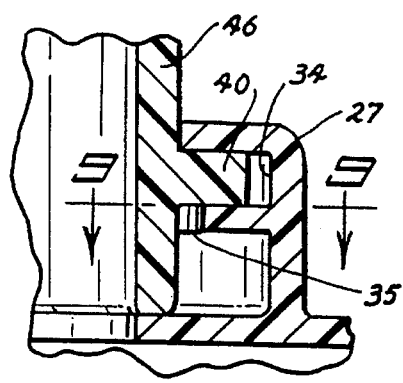
FIG. 8 is a sectional view taken along line 8—8 of FIG. 7.
Figure 9:
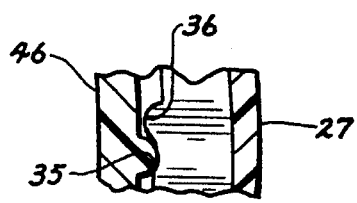
FIG. 9 is a sectional view taken along line 9—9 of FIG. 8 of the air intake.
Figure 7:
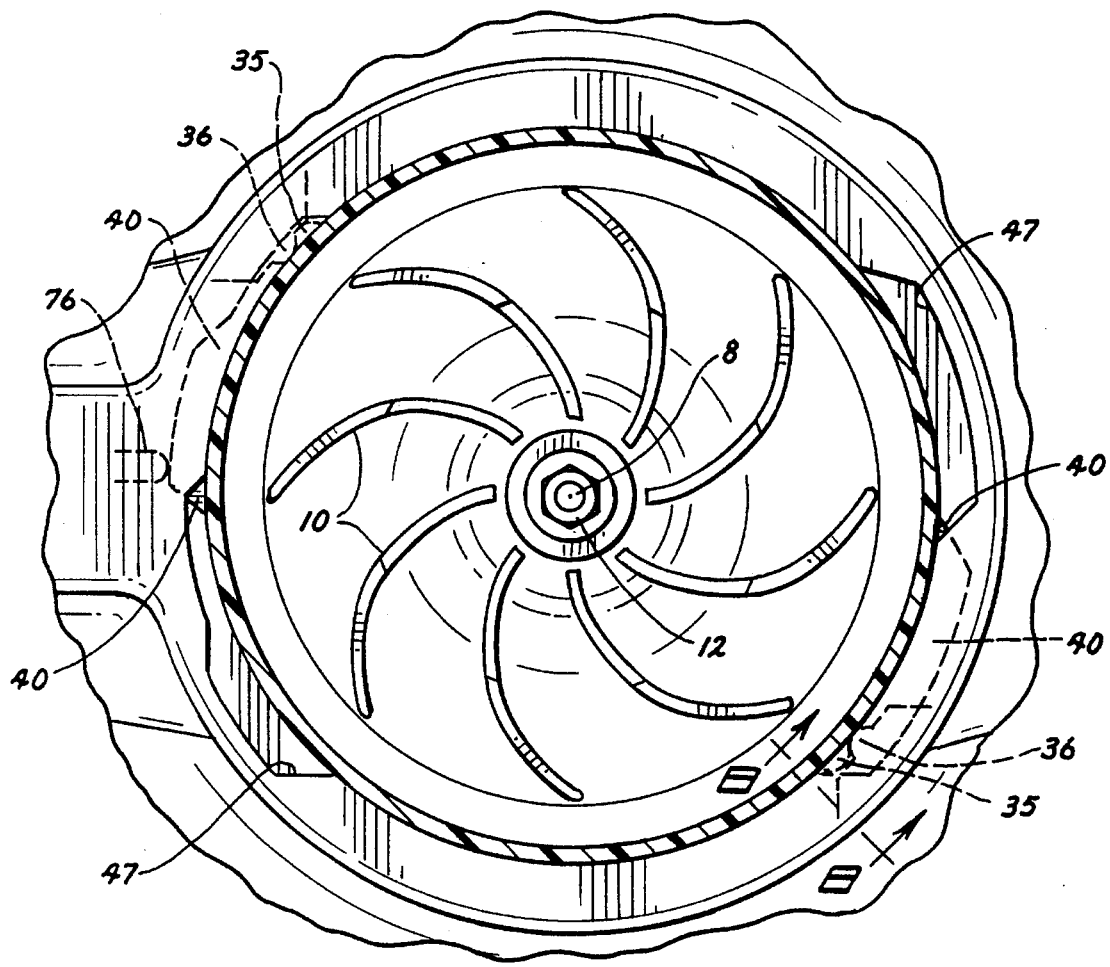
FIG. 7 is a sectional view taken along line 7—7 of FIG. 4 of the air intake opening area.

Next, the vacuum tube 46 and now interconnected vacuum tube extension 52 may be connected to the housing 4. The operator may grasp the primary handle 5 with one hand and the secondary handle 60 with the other hand. The secondary handle 60 may be grasped by wrapping the fingers of one hand around the compliant gripping surface 64. The compliant nature of the gripping surface 64 allows the surface to deform when grasped tightly, thus allowing for a sure and comfortable grip. The operator then aligns the longitudinal axis of the tube 46 with the longitudinal axis of the air inlet opening 26. The operator then moves the tube 46 toward the air inlet opening until the male engagement members 40 encounter the air inlet opening rim 27. See FIGS. 7 through 9. The two male engagement members 40 are sized differently from each other as are the slots 47 through which the engagement members 40 pass. The differing sizes of the slots 47 and male engagement members 40 are best shown in FIG. 7. The male engagement members 40 are sized to be just slightly smaller than the corresponding slots 47 shown in FIG. 7. With this arrangement, the vacuum tube 46 can only be oriented one way when it is engaged over the air inlet opening 26. If each male engagement member 40 is not aligned with the corresponding slot 47, then the operator must rotate vacuum tube 46 about the longitudinal axis relative to the air inlet opening 26 until the male engagement members 40 and the corresponding slots 47 are so aligned, while applying force such that, when such alignment is achieved, the vacuum tube 46 moves axially toward the air inlet opening 26 to the fullest extent possible. The operator may then rotate the vacuum tube 46 in a clockwise manner, The operator accomplishes rotation by continuing to hold the primary handle 5 in one hand and the gripping surface 64 of the secondary handle 60 with the other hand, utilizing the mechanical advantage created by the extended lever arm provided by the secondary handle legs 62 and turning the vacuum tube relative to the housing 4. Male engagement members 40 are thus axially retained in channel 34. The vacuum tube 46 is rotationally retained over the air inlet opening 26 as follows and as shown in FIGS. 7 through 9. Detent protrusions 35 on the vacuum tube 46 go over center with corresponding detent protrusions 36 which are located on the air inlet opening rim 27. One of the male engagement members 40 also engages and depresses the interlock switch actuator 76 so that the motor can be activated with the switch 16. The lever arm provided by the secondary handle 60 aids the operator in rotating the vacuum tube 46 so that the detent protrusions go over center with one another to rotationally restrain the vacuum tube 46.

Finally, the operator must attach the vacuum bag 13 to the housing outlet 11 via the bag connector 15. The operator may grasp the primary handle 5 with one hand and with the other hand hold the bag connector 15. The clips 70 on the connector 15 must be aligned with the receptacles 32 on the housing outlet 11 with the clip 70 end of the connector 15 nearer to the receptacles than the opposite end of the connector 15. The operator then moves the connector 15 toward the housing outlet 11 until the clips 70 engage the receptacles 32. The operator then places the vacuum bag 13 inlet over the flange 72 of the connector 15 and tightens a velcro strap (not shown) encompassing the vacuum bag 13 inlet in order to retain the vacuum bag 13 in place on the connector 15. The blower and vacuum unit may be supplied from the factory with the vacuum bag 13 already assembled to the connector 15.

The operator prepares for vacuum operation by placing the shoulder strap 74 of the vacuum bag 13 over one shoulder in order to support the vacuum bag 13 as the bag 13 fills with debris. While holding the primary handle 5 with one hand, the operator, with the other hand, may connect a female plug end, carrying electricity from an electrical power source, to the male plug 20. The operator may then, while still holding the primary handle 5 with one hand, slide the switch 16 into the on position with the other hand. Air and debris will flow up through the vacuum tube extension 52 and the vacuum tube 46, through the impeller 10, through the housing outlet 11 and into the vacuum bag 13. Vacuum bag 13 is constructed of a somewhat porous material that permits passage of the exhaust air through the bag 13 while retaining the debris within the bag 13. The operator may then grasp the primary handle 5 and the secondary handle 60. The separation of the primary 5 and secondary 16 handles creates a lever arm which enables the operator to easily and accurately control the unit during vacuum operation by adjusting the relative orientation of the operator's hands. The operator achieves an optimum orientation of the elliptical tube end 54 of the vacuum tube extension 52 when the leading edge of the tube 58 and the trailing edge of the tube 56 are approximately equidistant from the surface upon which rests the debris the operator desires to remove. The optimum distance of the trailing 56 and leading 58 edges of the tube from the debris depends on the properties of the debris, such as the debris' size, density, and quantity.

When the operator decides to stop using the blower/vac 2 in the vacuum mode, the operator may, while holding either the primary 5 or secondary 60 handle, use the operator's free hand to move the switch 16 to the off position, thus stopping the supply of electricity causing the electric motor 6 to stop. The extension cord should also be removed at this time. The operator may remove the vacuum bag 13 from the housing outlet while retaining a hold on either the primary 5 or secondary 60 handle and with the index finger and thumb of the free hand apply pressure to the clips 70 of the bag connector 15. While applying pressure, the operator must pull the bag connector 15 away from the housing outlet 11 until the bag connector 15 is free of the housing outlet 11. The vacuum bag 13 may then be emptied through an emptying seam (not shown) in the vacuum bag 13. The vacuum tube 46 and vacuum tube extension 52 can be removed from the housing 4 by grasping the gripping surface 64 of secondary handle 60 and rotating the vacuum tube 46 in a counterclockwise direction when facing the air inlet side of the housing 4. The secondary handle 60 provides a lever arm that aids the operator in rotating the vacuum tube 46 and extension 52. The vacuum tube 46 is rotated until male engagement members 40 are aligned with the corresponding slots 47. At that point, the vacuum tube 46 can be lifted axially away from the housing 4.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus recited in the following claims and equivalents thereof.

We claim:

1. A blower and vacuum unit comprising:

a housing including an air inlet opening, an air outlet opening and a fan scroll;

a primary handle connected to said housing;

a motor disposed within said housing;

an impeller operatively connected to said motor and disposed within said fan scroll;

a vacuum tube including means for connecting and disconnecting said vacuum tube to said air inlet; and a secondary handle attached to said vacuum tube wherein said convertible blower and vacuum unit further comprises a primary handle extension, said primary handle extension including a longitudinal axis and wherein said primary handle includes a longitudinal axis running perpendicular to the longitudinal axis of said primary handle extension.

2. The invention set forth in claim 1, wherein said primary handle extension extends perpendicularly from the front of said primary handle.

3. A blower and vacuum unit comprising:

a housing including an air inlet openings, having a perimeter an air outlet opening and a fan scroll;

a primary handle connected to said housing and including a longitudinal axis;

a motor disposed within said housing;

an impeller operatively connected to said motor and disposed within said fan scroll;

a vacuum tube including means for connecting and disconnecting said vacuum tube to said air inlet; and a generally U-shaped secondary handle attached to said vacuum tube wherein said means for connecting and disconnecting said vacuum tube to said air inlet comprises:

a male engagement member on said vacuum tube;

a slot on said housing and adjacent to said air inlet for allowing axial passage of said male engagement member; and a channel formed around at least a portion of said perimeter of said air inlet opening, said channel sized to permit passage of said male engagement member through said channel after said member has axially passed through said slot; and wherein said secondary handle comprises a generally compliant, cylindrical surface including a longitudinal axis running generally perpendicular to said longitudinal axis of said primary handle when said vacuum tube is fully engaged to said air inlet and wherein said generally compliant gripping surface comprises a series of open channels interspersed with legs of solid material in a laminar arrangement.

4. The invention set forth in claim 3, wherein said secondary handle further comprises a set of legs supporting said generally compliant gripping surface, said set of legs extending generally parallel to one another as said legs extend out from said vacuum tube and toward said gripping surface.

5. The invention set forth in claim 4, wherein said gripping surface extends between said legs at the end of said legs distal from said vacuum tube.

6. The invention set forth in claim 5, wherein said vacuum tube includes a longitudinal axis and wherein said each of said legs comprises a first section proximate to said vacuum tube, said first section extending away from said vacuum tube in a direction generally perpendicular to said longitudinal axis of said vacuum tube, and a second section interconnecting said first section and said gripping surface, said second section extending away from said first section at an angle of between 20 degrees and 40 degrees off of parallel to said longitudinal axis of said vacuum tube.

7. The invention set forth in claim 6, wherein said second section extends away from said first section at an angle of 32 degrees off of parallel to the longitudinal axis of the vacuum tube.

8. The invention of claim 7, wherein said legs include bases that wrap around at least a portion of the vacuum tube.

9. The invention of claim 8, wherein said gripping surface is curved along a radius extending between a point on the longitudinal axis of the vacuum tube and the side of the gripping surface facing the vacuum tube.

10. The invention of claim 9, wherein said radius is between 6.5 inches and 7.5 inches.

11. The invention of claim 10, wherein said radius is 6.94 inches.

12. A blower and vacuum unit comprising:
a housing including an air inlet opening and an air outlet opening;
a primary handle connected to said housing, said primary handle including a primary handle extension and further including a longitudinal axis;
a motor disposed within said housing;
an impeller operatively connected to said motor and disposed within said housing;
a vacuum tube including means for rotatably connecting and disconnecting said vacuum tube to said air inlet opening; and
a secondary handle attached to said vacuum tube and comprising:
a generally cylindrical, compliant gripping surface having a longitudinal axis running generally perpendicular to said longitudinal axis of said primary handle when said vacuum tube is connected to said air inlet; and
a set of legs supporting said gripping surface, said legs extending generally parallel to one another as said legs extend out from said vacuum tube and toward said gripping surface.

\* \* \* \* \*